June 11, 1968  F. H. GOODING  3,387,984
PROCESS OF PREPARING A REEL OF OIL IMPREGNATED CABLE
Original Filed April 1, 1965

INVENTOR
FRANK H. GOODING
BY Robert M. Sperry
ATTORNEYS

United States Patent Office 3,387,984
Patented June 11, 1968

3,387,984
PROCESS OF PREPARING A REEL OF OIL
IMPREGNATED CABLE
Frank H. Gooding, Pompton Plains, N.J., assignor to The
Okonite Company, Passaic, N.J., a corporation of
Delaware
Original application Apr. 1, 1965, Ser. No. 444,745, now
Patent No. 3,330,499. Divided and this application
Mar. 10, 1967, Ser. No. 622,220
2 Claims. (Cl. 117—7)

ABSTRACT OF THE DISCLOSURE

A process for preparing a reel of oil impregnated cable is disclosed. A cable is wound helically under constant tension around a drum rotating about a horizontal axis in several layers. The drum varies uniformly in diameter from one end to the other. The cable is wound with the ends spaced from the larger end of the drum. The reel of cable is impregnated with oil with the axis of the drum vertical and the larger end positioned lowermost.

---

This application is a division of application Ser. No. 444,745, filed Apr. 1, 1965, now Patent No. 3,330,499. This invention relates to the preparation of an oil impregnated reel of cable The cable is wound on the reel in a manner to prevent deformation of the cable during impregnation.

In the manufacture of paper-insulated power cable for high voltage transmission, a copper conductor is usually wound about with a plurality of layers of paper, and is then impregnated with oil in an autoclave. Impregnation involves the several steps of heating, evacuation, impregnation, and cooling, and is practiced as a batch process. It is customary in this process to wind the cable helically on a take-up reel and then place the reeled cable in the autoclave.

Autoclave tanks with both side and top loading are employed in the industry, for impregnation. When a side loading autoclave is used, the reel retains the same orientation as during winding, when being transferred to the autoclave and during the impregnation process; its axis remains horizontal. In the case of a top loading autoclave, the axis of the reel must be rotated 90° from its horizontal, take-up position, so that the axis is vertical, to permit its insertion in the autoclave; and it remains at this orientation during impregnation. This invention is concerned with a take-up reel for a top loading autoclave, and also with a technique for winding cable upon such a reel.

The impregnation process involves an initial step of heating the cable under vacuum, to drive out air and water and thereby to facilitate impregnation. Usually, the cable is heated during this initial step by passing an electrical current through it. However, heating the cable causes the copper conductor to expand relative to the steel drum of the reel, upon which the cable is wound, and so causes the cable to remove itself slightly from the drum. The paper insulation may also tend to shrink upon drying. The result is that the frictional forces holding the cable in position on the reel drum are reduced, and each turn of the cable must be supported by the turn underneath it. Consequently, the bottom turns support the the entire weight of the cable on the reel, and often the result is deformation of the cable.

While the present invention is primarily concerned with the manufacture of paper insulated high voltage cable, a reel design as described herein would be useful also for supporting in an autoclave, during vulcanization, cable insulated with a vulcanizable material, and should be used if the vulcanizing is performed in a top-opening autoclave, since the heat applied for vulcanizing would cause an expansion of the cable, and deformation of the insulation, similar to that which occurs during the oil impregnation process for paper insulated cable.

The expansion, that occurs upon heating the cable, takes place in two different, significant ways. First, there is an extension of the length of the cable. This is accompanied by a concomitant small reduction in the diameter of the paper insulation, as it also is forced to increase its lengthwise extent in order to conform to the increased length of the conductor. Secondly, since the cable is wound on the drum of the take-up reel, increase the increase in temperature, by extending the length of the cable, causes each turn of the cable to increase its diameter slightly relative to the diameter of the drum about which it is wound.

I have found that by using a particular structure for the reel itself, and by winding the cable in a specified manner on the reel, the expansion of the cable, and the reduction of diameter of each turn of the cable, upon the application of heat, will not result in the weight of the cable being on the lowermost windings. Rather, the weight is evenly distributed along the drum. In particular, this is accomplished by using a tapered drum on the reel and winding the cable about the drum with uniform tension, except that the cable is preferably initially spaced from the end of the drum having the greatest diameter. When the reel is then placed on a vertical axis with the wider diameter of the drum downwardly, frictional and vector forces are such as to cause the cable to be held against the drum and not pressed down upon the cable directly beneath it. Comparably, each layer of cable outside the innermost layer will press against the layer immediately inside it, rather than having each turn press against the turn below it.

I have also found that by winding the cable so as to proivde a void space between the end flange of the reel at the larger end of the reel drum, and the adjacent, confronting turns of the cable, deformation of the insulation is further avoided, since upon expansion of the cable, the cable turns can shift axially of the reel drum, without necessarily engaging against the end flange itself.

Among the objects of this invention, then, is to provide a method of winding electrical power cable on a take-up reel, while the reel is mounted for rotation about a horizontal axis, so as to prevent deformation of the cable when the reel is placed in a vertical position in an autoclave.

A further object of this invention is to provide such a method which utilizes friction of the cable against the surfaces of underlying layers of the cable, and against the surface of the reel drum, to resist harmful movement of cable during and after winding, while nevertheless permitting limited axial movement during subsequent processing steps, without permitting deformation of the cable.

A further object of this invention is to provide a wound reel of electrical cable which utilizes frictional and vector forces to control axial movement of the cable, that might result in undesired deformation, during processing steps in which the reel is in a vertical position.

A further object of this invention is to provide a reel with electrical cable wound thereon in which the drum of the reel is so formed as to provide a wider diameter at lower end thereof and thereby to create frictional and vector forces serving to control the axial position of the cable during heat treatments that occur during processing, while the reel is in an upright position.

Figure 2:
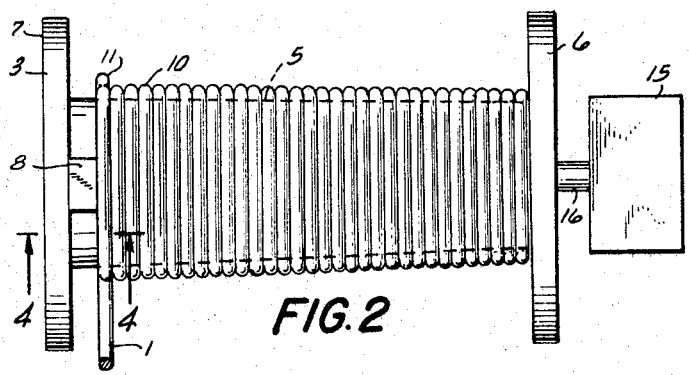
FIG. 2 is a fragmentary section taken on line 2—2 of FIG. 1, looking in the direction of the arrows, and showing the reel with one layer of cable thereon, and the beginning of the second.
Figure 3:
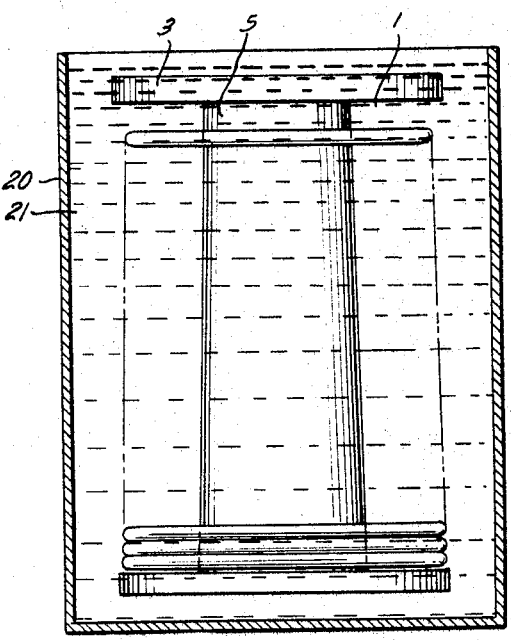
Figure 4:
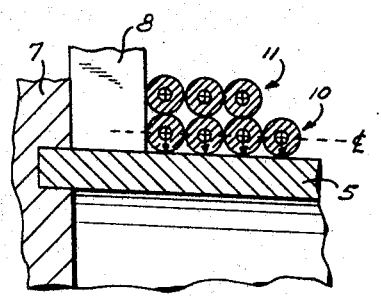

FIG. 3 is a section in a vertical plane, showing a reel wound in accordance with this invention with paper-insulated cable, and disposed in an upright position in a top-loading autoclave during the oil impregnation step; and FIG. 4 is a fragmentary section taken on line 4—4 of FIG. 2, looking in the direction of the arrows, and illustrating the frictional and vector forces in a reel of cable wound in accordance with the present invention.

Figure 1:
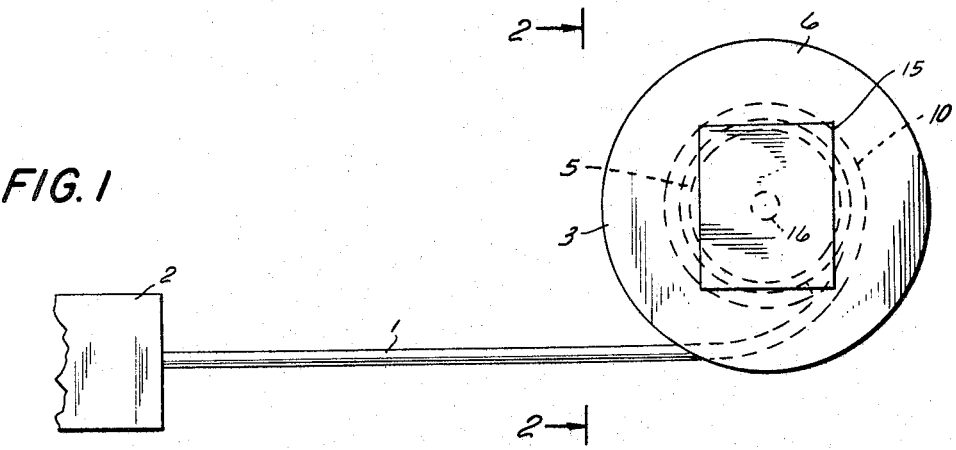
FIG. 1 is a fragmentary elevation showing cable being wound onto the drum of a take-up reel, in accordance with one embodiment of the invention.

Referring now in detail to FIG. 1, an electrical power cable 1, as it comes off a continuous production line or other source 2, is fed longitudinally to a take-up reel 3. The cable 1 is formed with a metallic conductor and plurality of windings of paper about the conductor, which windings are to be impregnated with oil.

The continuous production line indicated by the numeral 2 is of the customary nature and does not constitute a part of the present invention. In the usual case, the cable 1 comes off the production line 2 at a constant rate of speed and is wound about the take-up reel 3 under constant tension. The leading free end of the cable is secured to the take-up reel by a clamp (not shown), a rope, or in any other convenient or usual way.

The take-up reel 3 is formed with a drum portion 5 and with flanges 6 and 7 at the opposite ends of the drum. It is mounted so that its axis is horizontal. Normally, the drum portion of a conventional take-up reel is formed with a constant diameter throughout its length. The drum of a take-up reel made in accordance with the present invention, however, is formed with a diameter that is tapered from one end to the other. This taper preferably is uniform throughout the length of the drum. The taper is such that the diameter of the drum is greater toward the end of the reel that will be in the bottom position, when the reel is disposed in a top-opening autoclave.

As the cable 1 is wound helically on the drum 5, it forms a series of layers, the innermost of which is identified by the numeral 10, and the second of which is indicated, in FIG. 2, with the numeral 11.

A motor drive and speed regulating unit 15 is positioned along the axis of the reel at one end thereof and is connected to the reel through a driving axle 16.

It has been the practice in the past, when winding electrical cable about a reel having a drum of uniform diameter, to rotate the reel at a speed such that the rate of take-up is exactly equal to the rate at which the cable 1 comes from the production line 2. Thus, the rate of rotation of the reel 3 would be constant while an entire layer, such as the initial layer 10, was found about the drum 5. The rate of rotation would then be slowed down slightly for the next second layer 11, which has a greater circumference, so that the linear rate of take-up would remain the same as the rate of production. The rate of rotation would be similarly reduced for each additional layer. Thus, the peripheral speed of the outermost layer of cable on the reel 3 would always be the same as the rate of output from the line 2. In the practice of my invention, a constant peripheral speed is also used, and the cable is wound upon it at a constant tension and at a constant peripheral speed.

As shown in FIG. 2, the reel drum 5 has a smaller diameter at its right end (in FIG. 2) than at the left end. I have determined that the most satisfactory value of taper for the drum 5 is about 2% to about 5% of the traverse (the distance between the flanges). A good average value would be 3%. This means that if the traverse of the drum is one hundred inches, then the radius of the drum will be, for example, about two inches to about five inches, and preferably about three inches greater at its large end than it is at the small end.

As an example of the use of my invention, a reel having a flange diameter of 166", a tapered drum diameter varying from 115" to 121", and a traverse of 100", has been very satisfactory for use with high voltage, paper-insulated cables having diameters on the order of 3½" to 4". A cable of this size is ordinarily wound on the reel about six layers deep, with the traverse direction reversed at the end of each layer.

In addition, the cable preferably is not wound along the entire length of the drum 5, but rather some space is left between the end flange 7, that has the greater diameter, and the last turn of cable in the layer, as is shown in FIGS. 2 and 4. The size of this space may vary, but a spacing of about two cable diameters is satisfactory. If desired, in this respect, some kind of spacing means, such as a spacer 8 (FIG. 2) may be used to prevent the cable from shifting and abutting against the flange 7. The spacer 8 would then be removed before heat treatment, to permit axial shifting of the coiled cable, upon expansion. The trailing free end of the cable is secured to an end flange, or, in case several reels are required for a single length of cable, the cable is wound about the drum of a second reel.

Thus, I have produced a reel having a tapered drum and a plurality of layers of cable wound thereabout, having uniform tension and frictional forces about the drum, and preferably with some space between the end flange at the wider end of the drum and the adjacent turns of cable. When this reel is placed in an autoclave with its axis vertical, frictional forces between the drum and the innermost layer of cable, and between the respective confronting, engaged layers of cable, tend to prevent the cable from sliding down toward the wide end of the drum. This means that instead of the lowermost turns of cable supporting the weight of all of the cable above them, at least a substantial part of the weight will be supported by frictional forces applied uniformly throughout the length of the drum.

In FIG. 3 there is schematically represented an impregnating autoclave 20 containing an impregnating oil 21. Positioned within the autoclave 20 is the take-up reel 3 on which several layers of cable have been wound. The reel is in an upright position, with its wider diameter at the bottom.

The usual technique for treating cable in an autoclave is to seal the autoclave, evacuate it to remove all air that may be trapped among the paper windings, heat the cable by running an electric current through the metallic conductor, and thereafter treat the heated cable with oil at an elevated temperature, and often at an elevated pressure, in order to insure complete impregnation.

When the cable is heated in the autoclave as shown in FIG. 3, the cable itself expands in length, and, in the case of paper-insulated cables, the paper dries out and tends to contract. The result is that the cable extends itself lengthwise, with the concomitant result that the inside diameters of the respective turns of cable are increased. In the normal situation, this would cause the weight of the entire cable to be applied on the lowermost turns of the cable. In the reel of my invention, however, the cable tends to slide down on the tapered drum until the frictional forces between the cable and the drum, and between the respective confronting, engaged turns of the several layers of cable, are such that the weight of the cable is substantially supported by these frictional forces. This is in contrast to the situation that has prevailed in the past, where the lowermost turns of the cable have been pressed against the end flange and each other by the overlying turns of cable, and hence have often been distorted in shape. As shown in FIG. 3, the cable has expanded through heat treatment, and has dropped down so that most of the spacing that was at the widest end of the drum now appears at the narrowest end, and but little of the original space remains.

FIG. 4 shows a section of a portion of the lower drum and a few turns of cable when the reel is positioned with its axis vertical, with the lowermost turns of cable spaced from the end flange. This figure serves to illustrate some of the advantages of the use of the tapered drum. It will be noted that portions of the drum 5 and the end flange 7 are shown, together with layers 10 and 11 of the cable. A centerline has been indicated for the layer 10, and there would be a corresponding centerline for other, successive layers. The four turns of the cable that are illustrated in the drawing as a part of the layer 10 are each shown with an imaginary vector arrow to represent the forces created by the tension in the cable. These forces are normal to the surface of the drum 5, as indicated by the vector arrows. These forces tend to hold the cable 12 against the drum 5, and to accentuate the normal frictional effect.

Since the winding tension on the cable has been uniform, the frictional forces between the several cable turns and the drum 5 will be substantially constant throughout the cable length. It can therefore, be seen that the frictional forces are substantially the same for all of the cable turns in each layer.

There is an additional advantage, however, obtained when a tapered drum 5 is used. As shown in FIG. 4, under these circumstances, the centerline of a given layer is not vertical. Thus, the gravitational vector, which is vertical, will not act directly along the centerline, but a portion of the forces involved will be applied to the surface of the drum. Thus, the weight effect, which causes turns above to weigh down on the turns below them and tend to deform them, is reduced not only by the increased friction between the drum and the cable turns, but also by the angle which causes a decrease in the gravitational vector. This effect is also found in each of the other layers of cable that are wound around the drum 5.

By utilization of the process and structure of my invention, it has been found that not only are the advantages of initial winding about a horizontal axis obtained, but also that the deformation during impregnation, of the lower turns of cable, has been greatly reduced, if not eliminated.

As has been pointed out, it is often preferable to wind cable on the reel with a space between the last turns of cable and the end flange at the wide end of the reel. However, this is not essential. Some space is created between each pair of adjacent turns of the cable due to the contraction of the insulating wall during drying. The sum of these spaces may be sufficient to allow the downward movement of the cable during drying. In this case there may be no need to leave a space between the bottom turns and the flange.

While the invention has been described herein by reference to preferred embodiments thereof, then, it is to be understood that such description is intended in an illustrative, rather than a limiting sense, and it is contemplated that various modifications in the construction and arrangement of the parts and in the practice of the process will readily occur to those skilled in the art, within the spirit of the invention and the scope of the appended claims.

I claim:

1. The process of preparing a reel of oil impregnated cable including the steps of receiving said cable from a source thereof and feeding it at a constant tension to a reel which is rotating about a horizontal axis, winding said cable helically about the drum of said reel to form a series of layers therearound, said drum being dimensioned so as to vary uniformly in diameter from one end to the other, said layers being wound with the ends thereof spaced from the larger end of said drum, and thereafter impregnating said reel of cable with oil while the axis of said reel is vertical and with the drum portion having the greater diameter lowermost.

2. The process of preparing a reel of oil impregnated cable including the steps of receiving said cable from a source thereof and feeding it longitudinally to a reel which is rotating about a horizontal axis, winding said cable helically about the drum of said reel to form a series of layers therearound, with said layers spaced from one end thereof, said drum having a uniformly varying diameter with the greater diameter at the end of said reel spaced from said layers, maintaining the peripheral speed of take-up of said cable in said layers constant relative to the rate of feeding of said cable from said source to produce uniform tension in said cable, and thereafter oil impregnating said reel of cable with the axis thereof vertical and with the drum positioned with its wider diameter lowermost.

References Cited
UNITED STATES PATENTS

| | | | |
|---|---|---|---|
| 2,709,553 | 5/1955 | Wellcome | 242—176 X |
| 3,118,627 | 1/1964 | Nelson et al. | 242—45 X |

ALFRED L. LEAVITT, *Primary Examiner.*

C. R. WILSON, *Assistant Examiner.*

UNITED STATES PATENT OFFICE
CERTIFICATE OF CORRECTION

Patent No. 3,387,984　　　　　　　　　　　　　　　June 11, 1968

Frank H. Gooding

It is certified that error appears in the above identified patent and that said Letters Patent are hereby corrected as shown below:

Column 1, line 28, after "cable", first occurrence, insert a period. Column 2, line 13, after "reel," cancel "increase"; line 38, "proivde" should read -- provide --; line 53, after "of", second occurrence, insert -- the --. Column 3, line 53, "found" should read -- wound --; line 75, "my" should read -- our --.

Signed and sealed this 4th day of November 1969.

(SEAL)
Attest:

Edward M. Fletcher, Jr.　　　　　　　　　　WILLIAM E. SCHUYLER, JR.
Attesting Officer　　　　　　　　　　　　　　　Commissioner of Patents